United States Patent [19]

Ramunas

[11] 4,289,051

[45] Sep. 15, 1981

[54] OBJECT CENTERING AND MOVING MECHANISM

[75] Inventor: Valdas S. Ramunas, Euclid, Ohio

[73] Assignee: Acme-Cleveland Corporation, Highland Heights, Ohio

[21] Appl. No.: 41,696

[22] Filed: May 23, 1979

[51] Int. Cl.³ .................. B23B 13/02; B23B 25/06
[52] U.S. Cl. ........................ 82/45; 82/2.5; 82/2.7; 144/209A; 226/19
[58] Field of Search ............... 82/45, 2.5, 2.7; 144/209 A; 226/19, 176, 177, 186

[56] References Cited

U.S. PATENT DOCUMENTS

| | | | |
|---|---|---|---|
| 3,154,119 | 10/1964 | Saison | 144/209 A |
| 3,504,719 | 4/1970 | Don | 82/45 |
| 3,510,042 | 5/1970 | Romere | 226/177 |
| 3,664,395 | 5/1972 | Reed | 144/209 A |
| 3,791,564 | 2/1974 | Hugonin | 226/19 |
| 4,116,094 | 9/1978 | Dombrowski et al. | 82/2.5 |

*Primary Examiner*—Leonidas Vlachos
*Attorney, Agent, or Firm*—Pearne, Gordon, Sessions, McCoy & Granger

[57] ABSTRACT

A mechanism is disclosed to raise a round or hexagonal object having a center and to establish the center on a fixed reference line regardless of the diameter of such object within a finite range of diameters. First and second caliper means engage opposite sides of each such object to sense the diameter and to act through a lever linkage with a two-to-one mechanical advantage so that a stop on the linkage coacts with a fixed frame. The calipered diameter of the object establishes the position of the stop means relative to the fixed frame so that the center of the object is on the fixed reference line regardless of the diameter of the object. The foregoing abstract is merely a resume of one general application, is not a complete discussion of all priciples of operation or applications, and is not to be construed as a limitation on the scope of the claimed subject matter.

21 Claims, 6 Drawing Figures

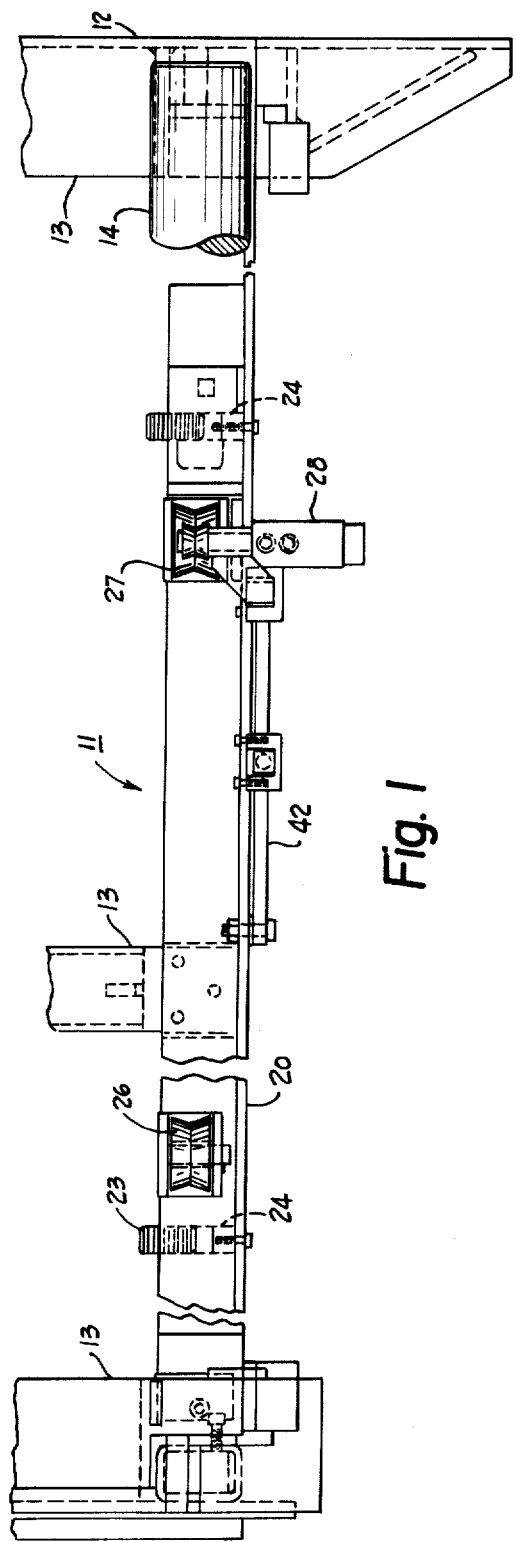
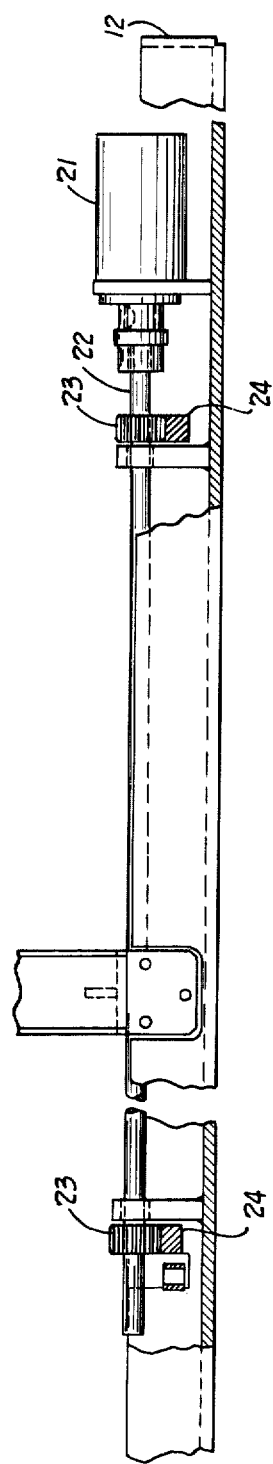

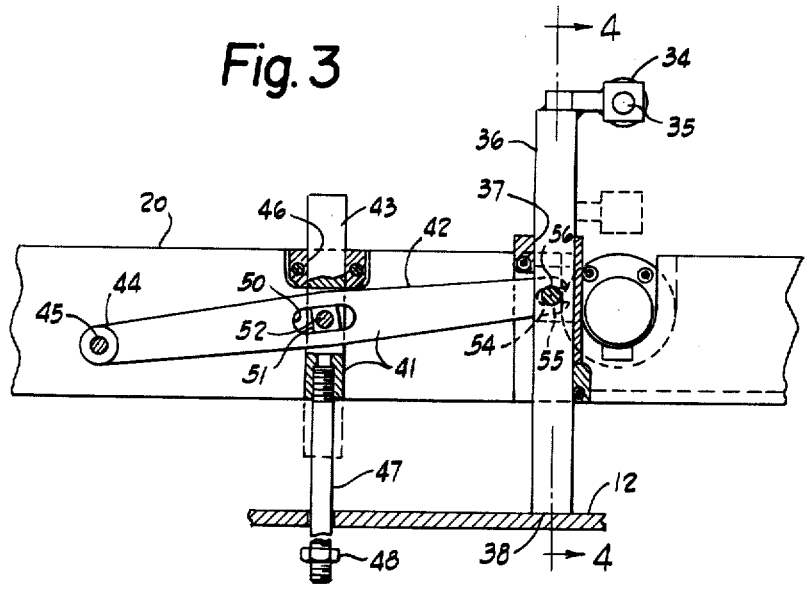
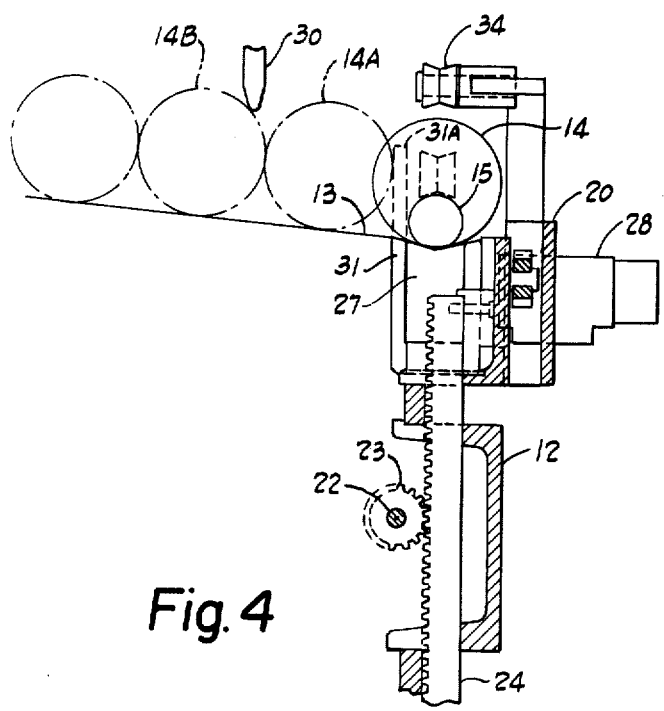

OBJECT CENTERING AND MOVING MECHANISM

BACKGROUND OF THE INVENTION

Object centering and moving mechanisms have previously been proposed. In U.S. Pat. No. 3,504,719, a lifting and centering device for variable diameter logs is disclosed with each end of the log raised by a fluid cylinder until two sensing arms at each end are actuated in sensing the diameter and actuate a switch at each end of the log to discontinue movement of the respective fluid cylinder. A somewhat similar arrangement is disclosed in U.S. Pat. No. 4,116,094 for centering the position of two railroad car wheels on a single axle. Each wheel is lifted independently by separate motors and when the diameter is sensed, the particular motor is de-energized to thus center each end of the axle.

In U.S. Pat. No. 3,791,564, a longitudinally moving pipe is centered, even though the pipe may have enlarged portions, by means of an upper V-roller on one vertical run of an endless chain and a lower V-roller on the opposite run of that endless chain.

Multiple spindle automatic machine tools are those machine tools which are used for repetitive machining of identical workpieces where a large volume of workpieces is desired. Typically, such machines are used to produce millions of identical parts. Such machines are expensive, but when properly set up to machine a particular workpiece, the machines operate with a bare minimum of attention from an operator, and hence, the manufacturing cost per piece is at a minimum. Such machines operate on a range of sizes of chucked workpieces, or, where used with long bar stock, with a range of diameters of such bar stock, either round or polygonal in cross section. Where such machines are present but not in use in production, this is a large capital investment remaining idle, so it is highly desirable to be able to put the machine to use, even if it is for a relatively short run. However, many such multiple spindle automatic machine tools require eight hours or more for set-up time to change all the tooling and make all the adjustments necessary for a new size of bar stock and a new and different piece to be produced. Just to change the size of the bar stock, in the prior art machines, one must change the escapement mechanism to feed a different size bar into the bar feeder and also one must change the adjustment to support the bar on the same center line as the spindle of the machine tool. On the usual prior art machines, this is accomplished by replacing several semicylindrical spacers inside a longitudinally split tube. This is lost production time for the installation and adjustment, and additional cost results from the manufacture and storage of such spacers.

The prior art constructions have the deficiency of being able to lift the object only a minor fraction of the diameter of such object and, hence, are not suitable for mechanisms wherein a large lifting distance is required.

Accordingly, the problem to be solved is how to construct a machine tool which will lift and center objects, such as elongated bars for a machine tool, so that the bars are on the center line of the machine tool spindle regardless of the diameter of such bars and regardless of the distance to be lifted.

SUMMARY OF THE INVENTION

This problem is solved by an object centering and moving mechanism for objects having a center line comprising, in combination, a fixed frame, a movable frame movable in a first path on said fixed frame, first caliper means on said movable frame to engage one side of any said object, second caliper means complementarily cooperable with said first caliper means to engage the opposite side of the object, a linkage acting between said first and second caliper means, stop means acting between said fixed frame and said linkage, and said linkage including a 2:1 mechanical advantage of twice the relative motion between said first and second caliper means compared with the relative motion between said stop means and said fixed frame, whereby said movable frame may be moved in said first path to move any said object and to move said linkage to a point whereat said stop means is activated and said first and second caliper means engage opposite sides of any said object to establish the center line of said objects at a fixed reference point along said first path regardless of the diameter of said object.

This invention is further solved by an object centering and moving mechanism for objects having a center including first and second caliper means relatively movable to engage opposite sides of each of said objects and a movable frame adapted to engage the object to move it relative to a fixed frame to have the center of the object at a fixed reference point, characterized in that a mechanical advantage linkage is connected to said first and second caliper means to provide twice the relative motion between the first and second caliper means compared with the relative motion between a stop means acting between said linkage and said fixed frame.

An object of the invention is to be able to center objects while they are being lifted with a purely mechanical device with the centering being automatically accomplished regardless of the diameter of the object.

Another object of the invention is to provide an automatic bar-lifting and centering object for a machine tool, regardless of the diameter of the bar, with no adjustments being necessary for various diameters.

Another object of the invention is to provide an object centering and moving mechanism which will move an object along a first path to be centered on a fixed reference axis regardless of the cross sectional dimension of such object.

Other objects and a fuller understanding of the invention may be had by referring to the following description and claims, taken in conjunction with the accompanying drawing.

BRIEF DESCRIPTION OF THE DRAWING

FIG. 1 is a plan view of an object centering and moving mechanism in accordance with the invention;

FIG. 2 is a partial view of the mechanism of FIG. 1, similar to a plan view but taken through a section below that view of FIG. 1;

FIG. 3 is an enlarged, partial elevational view of the mechanical advantage linkage;

FIG. 4 is a sectional view of line 4—4 of FIG. 3;

DESCRIPTION OF THE PREFERRED EMBODIMENTS

Figure 5:
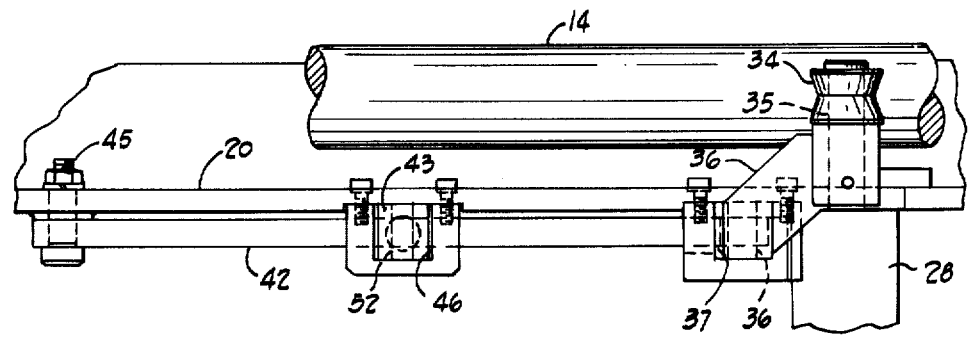
FIG. 5 is an enlarged, partial plan view of the mechanical advantage linkage.

FIGS. 1–5 illustrate an object centering and moving mechanism 11 incorporating the present invention. This mechanism 11 includes a fixed frame 12. Three ramp supports 13 are fixed on the frame 12 and adapted to support long bars 14 which are the objects to be centered. These bars 14 may be the maximum size of a given size range, or may be minimum size objects 15 (see FIG. 4). As an example, these long bars 14 or 15 might be round cross section bars which are being fed to a machine tool, not shown, for machining and cut-off therein. As in many machine tools, a range of sizes of a maximum diameter D1 to a minimum diameter D2 may be utilized in the machine tool and the present object centering and moving mechanism 11 is to feed such objects or bars to the machine tool with the center line of the objects positioned on the machine tool center line 18, regardless of the diameter of such objects 14 or 15. The present mechanism 11 lifts the object to the center line 18 and automatically compensates for the size of the object.

A beam 20 is guided in the fixed frame 12 for vertical movement. A fluid motor, such as a hydraulic motor 21, is mounted in the fixed frame 12 and rotates a shaft 22 carrying pinions 23 thereon to elevate vertically disposed racks 24. The upper end of these racks is secured to the beam 20 to provide vertical reciprocation of such beam. Accordingly, both ends of the beam 20 move simultaneously so that the beam remains horizontal.

Journaled on the beam 20 are V-block pulleys 26 and 27, with pulley 26 being an idler pulley and pulley 27 being a drive pulley driven by motor 28. These pulleys 26 and 27 are adapted to cradle any one of the bars 14 or 15 so that it may be centered in a vertical plane and moved in a first path, which in this embodiment is a vertical path, for lifting movement to the center line 18 of the machine tool. The bars 14 or 15 are adapted to lie on the ramp supports 13 in a serially disposed manner with an escapement pawl 30 actuated in some manner, not shown, in timed relation to the raising and lowering of the beam 20 to feed successive bars 14 or 15 onto the V-pulleys 26 and 27. An abutment stop 31 may be actuated to an elevated position 31A, shown in FIG. 4, to provide a stop for bars, such as 14A, on the ramp support 13. When this abutment stop 31 is lowered, then such bar 14A may be permitted to roll onto the V-pulleys 26 and 27 while the next bar 14B is retained by the escapement pawl 30.

The pulleys 26 and 27 may be considered a movable frame, movable in the first vertical path on the fixed frame 12. First and second caliper means are also provided in the mechanism 11 to engage opposite sides of any object 14 or 15. In this preferred embodiment, the drive V-pulley 27 may be considered the first caliper means which engages the lower side of any such object or bar 14 or 15. The second caliper means is disclosed as an idler V-pulley 34 disposed immediately above the drive V-pulley 27 to engage the opposite side of any bar 14 or 15. This idler V-pulley 34 is journaled on a shaft 35 carried on an L-shaped arm 36, the lower vertical portion thereof being guided at 37 in the beam 20. The lower end 38 of this arm 36 is adapted to abut the fixed frame 12 when the beam 20 is in the lower position ready to accept additional bars from the ramp support 13. This raises the idler V-pulley 34 sufficiently, as shown in FIG. 4, so that bars may roll onto the drive pulley 27.

A linkage 41 acts between the first and second caliper means 27, 34. This linkage 41 includes a lever 42 and a stop bar 43 so constructed and arranged as to provide a 2:1 mechanical advantage of twice the relative motion between the first and second caliper 27, 34 compared with the relative motion between the stop bar 43 and the fixed frame 12. The lever 42 has a first end 44 which is pivoted on a pivot shaft 45 to the beam 20. The stop bar 43 is guided at 46 in the beam 20 for vertical movement. The lower end of the stop bar 43 is threaded to receive a threaded adjustable stop bolt 47. A nut or head 48 of the bolt 47 may engage the underside of the fixed frame 12 as an adjustable stop for this stop bar 43. The lever 42 at its midpoint has an elongated slot 50 in which a block 51 is slidable, the block being carried on a shaft 52 fixed in the stop bar 43.

A second end 54 of the lever 42 has a fork 55 which is slidable on a shaft 56 fixed in the L-shaped arm 36.

OPERATION

The cycle of operation is repetitive so the explanation may start at any point in the cycle. The object centering and moving mechanism 11 is capable of operating on a range of sizes from a maximum diameter object D1, called bar 14, to a minimum diameter object D2, called bar 15. The mechanism automatically compensates for the size of the object and provides both automatic centering and moving of the object in a first path. As illustrated in this preferred embodiment, the first path is vertical and the object is lifted so that the center of such object is on the center line 18 of the machine tool, not shown.

When the abutment stop 31 is lowered to the solid line position, as shown, the lowermost bar 14A may roll onto the drive V-pulley 37 to be centered in a vertical plane. Assuming first that this is the maximum size object 14, then this will be as illustrated in solid lines in FIG. 4. The motor 21 may then be actuated to raise the racks 24 and the beam 20 which elevates the pulleys 26 and 27, and hence, elevates the elongated bar 14 carried thereon. FIG. 3 best illustrates the action of the linkage 41. For each initial increment of movement of the beam 20 in an upward direction, e.g., an increment of 0.001 of an inch, the lever 42 provides a 2:1 mechanical advantage. This means that because the stop bar 43 is at the midpoint of the lever 42, and because the second end 54 of the lever is at that time stationary, the stop bar 43 will move upwardly a distance of 0.0005 of an inch, or half the amount that the first end 44 of the lever moves. By this means, the drive V-pulley 37 is moving upwardly, carrying with it the bar 14, but the idler V-pulley 34 is stationary in space at that time. This is because the L-shaped arm 36 is resting on the fixed frame 12. This resting on the frame establishes the V-pulleys 34 and 27 spaced apart a distance sufficient so that the largest size object 14 may roll in between these pulleys. Suppose, as shown in FIG. 4, there is initially a spacing of 0.5 inch between the idler pulley 34 and the top of the bar 14, then when the first end of the lever 44 moves upwardly 0.5 inch, the V-pulley 27 will have moved upwardly 0.5 inch so that the top of the bar 14 just touches the idler V-pulley 34. This eliminates the lost motion between these two pulleys and bar and at the same time the stop bar 43 will have moved upwardly 0.25 inch. From this point on, any further movement of the beam 20 will not rotate the lever 42 about the second end 54. Instead, it will move this lever 42 in translation; namely, the lever 42 will maintain its same angular attitude relative to the horizontal and the two ends plus the middle will all move upwardly at the same speed, namely the speed of the beam 20. From the moment that the idler V-pulley 34 engages the bar 14, then the spacing between the stop bolt head 48 and the underside of the fixed frame 12 will determine the amount of movement in the first vertical path. In one machine designed according to the invention, this lifting movement was nine inches and the bar 14' would then be centered at the center line 18 of the machine tool. When the head 48 of the stop bolt engages the fixed frame, this provides a positive stop against movement of the beam 20 and, hence, the centering and lifting movement is entirely mechanical, not dependent on any switches or valves. Hence, the mechanism is extremely rugged and reliable, capable of operating through millions of cycles without requiring attention or adjustment.

Next, the fluid motor 28 may be actuated to drive the drive pulley 27. Since the elongated bar is resiliently squeezed between the pulleys 27 and 34 by the fluid motor 21, the rotation of the drive pulley 27 will drive the elongated bar 14 longitudinally into the machine tool, not shown. Next the fluid motor 21 may be reversed to lower the beam 20 and as it is lowered to the full line position of FIG. 4, the abutment stop 31 is lowered sufficiently so that the lowermost bar 14A may roll onto the V-drive pulley 27 ready for the next cycle of operation.

If the machine tool is now to be changed to utilize a different size bar, for example, the minimum size bar 15, then no adjustments to the mechanism 11 are required. Instead, the small size bars 15 would be loaded onto the ramp support 13 and one would be passed by the escapement mechanism 30 and the abutment stop 31 so that one such small bar 15 would rest on and be centered in a vertical plane on the concave surface of the V-drive pulley 27. According to the above example, let it be assumed that the maximum size bar 14 was 3.5 inches in diameter and the minimum size bar was 1.5 inches in diameter, or a two-inch difference in diameters. In the above example, a clearance of 0.5 inch was provided between the idler pulley 34 and the upper surface of the large bar 14. Now with the samll diameter bar 15, there will be a 2.5 inch clearance. Accordingly, as the beam 20 is lifted through this distance of 2.5 inches, the first end 44 of the lever 42 will raise 2.5 inches to have the small diameter bar 15 raised so that it just touches the idler pulley 34. During this time, the stop bar 43 will have raised 1.25 inches. Accordingly, there will be only eight inches of distance remaining between the head 48 and the underside of the fixed frame 12. This means that as the beam 20 is continued to be raised, with the lever 42 now being moved in translation, the beam 20 will move upwardly only eight inches, not nine inches, and thus the center of the small bar 15 will be raised, as shown at 15' in FIG. 4, to lie on the center line 18 of the machine tool spindle. In the first example above with the large bar 14, it will be noted that the beam was raised 0.5 inch plus nine inches, or a total of 9.5 inches. With the small bar 15 being raised, the beam was raised 2.5 inches plus eight inches, or 10.5 inches, namely, one inch further, so that the small bar is raised further to have its center lying on the center line 18.

Figure 6:
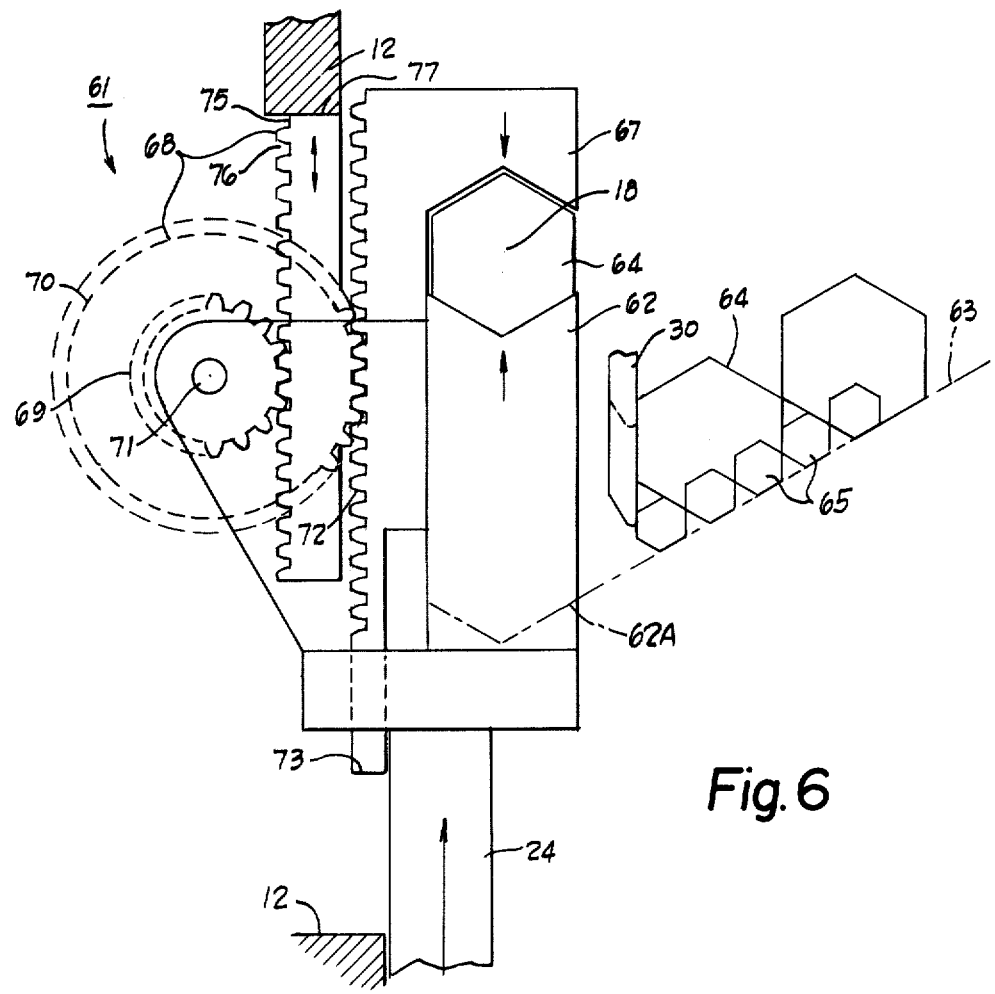
FIG. 6 is an enlarged end view of a modification.

FIG. 6 illustrates a modification of the object centering and moving mechanism 61 which is used with the fixed frame 12 and a movable frame 62 which has a V-block support for a range of sizes of objects, including maximum size objects 64, and the minimum size objects 65, each of which may be supported on a ramp surface 63. The objects 64 and 65 may be any which have a center or center line, and in FIG. 6 these are illustrated as hexagonal cross section objects, such as hexagonal bars, adapted to be fed to a machine tool, not shown. The ramp support 63 is shown disposed at an angle of about 30° in order to positively feed these objects to the movable frame 62 when it is lowered to the dotted-line position 62A. Again, the escapement pawl 30 may be used with either size object 64 or 65 to feed such objects one at a time to the movable frame 62. The movable frame 62 provides a lower V-block support for the object 64 or 65 and this may be considered a first caliper means. A second caliper means 67 is provided by an upper V-block which is slidable relative to the movable frame 62, in this embodiment slidable along the first path which is vertical. The upper and lower V-blocks establish the object 64 centered in a vertical plane in which lies the vertical first path. Means such as the rack 24 is provided to establish movement in this first vertical path of the V-block 62. Linkage 68 is provided between the first and second caliper means 62 and 67. This linkage 68 again includes 2:1 mechanical advantage of means shown as a pinion 69 and a second pinion 70 or gear sector of twice the pitch diameter. The first and second pinions 69 and 70 are fixed to rotate together and are journaled on a shaft 71 carried on the movable frame 62. The upper V-block 67 is guided for vertical movement relative to the movable frame 62 and a rack 72 on this upper V-block 67 meshes with the larger pinion 70. The lower end 73 of this rack may abut the fixed frame 12 to open the V-blocks 62–67 so that new workpieces may be fed therebetween. The linkage 68 includes a stop bar 75 which is guided for movement in a vertical path. This stop bar 75 has a rack 76 thereon meshing with the small diameter pinion 69. The stop bar 75 coacts with the fixed frame 12 in some manner and in FIG. 6 this is illustrated as the upper end 77 of the stop bar 75 being engageable with the fixed frame 12 as a stop.

OPERATION

FIG. 6 is illustrated with the object 64 raised to the center line 18 of the machine tool, not shown, whereas, in FIG. 4 the solid line position was with the drive V-pulley 27 in the lowermost position. If the mechanism 61 of FIG. 6 is started with the movable frame 62 in the lowermost position 62A, then an object such as object 64 may be fed by the escapement mechanism 30 onto this movable frame. In this condition, the lower end 73 of the upper V-block 67 will abut the fixed frame 12 to open the V-blocks 62, 67 for admission of the workpiece 64. During the initial part of the upward movement of the rack 24 and V-block 62, the upper V-block 67 will be stationary, urged by gravity into engagement with the lower fixed frame 12. As the movable frame 62 is raised in this initial part of the movement, the 2:1 mechanical advantage linkage 68 will move the stop bar 75 upwardly at one-half the rate of speed of frame 62. When the upper surface of the object 64 engages the upper V-block 67, then the rotation of the pinions 69 and 70 will cease and from that time onward the entire mechanism moves upwardly as a unit. This upward movement continues until the upper end 77 of the stop bar 75 engages the fixed frame 12. This provides a positive stop for the entire mechanism 11 and positions the large workpiece 64 on the center line 18.

If a small diameter workpiece 65 is being centered and lifted, then the movable frame 62 must move a greater distance before the upper surface of the object 65 engages and starts to lift the upper V-block 67. Accordingly, there is a longer period of time when the 2:1 mechanical advantage is being actuated so that the total upward movement of the movable frame 62 is increased and, hence, the center of the small object 65 will also be automatically positioned on the center line 18 of the machine tool.

It will be noted that the lower V-supports 27 or 62, act as a first caliper means and the upper V-pulley 34, or V-block 67, acts as a second caliper means. These two caliper means are engageable with opposite sides of the object 14 or 15, or 64 or 65. These calipers determine the cross sectional dimension of such objects to automatically assure that the object, regardless of diameter, is raised to the constant height center line 18. The linkage 41 or 68 provides a 2:1 mechanical advantage of twice the relative motion between the first and second caliper means compared with the relative motion between the stop bar 43 or 75 and the fixed frame 12. The caliper means of the two embodiments illustrated are relatively movable along a path which, in this case, is coincident with the first path of movement of the supporting V-pulley 27 or V-block 62. The first caliper means 27 or 62 has a concave surface to engage objects whether they are round or polygonal in cross section. As shown in FIG. 6, if hexagonal objects are to be fed, then the V-block 62 may conveniently have a V with an included angle of 120°. With the lever linkage 41 shown in FIGS. 1–5, it will be noted that the stop means acts between the fixed frame 12 and the midpoint of this lever 42 to establish the 2:1 mechanical advantage.

In both embodiments shown, it will be noted that the objects 14, 15, 64 or 65 may be moved in the first path; namely, lifted vertically, a distance many times the diameter of such object. This is an advantage over the prior art constructions and is achieved by the 2:1 mechanical advantage, rather than the 1:1 motion of the prior art sensing devices.

Various modifications apparent to those skilled in the art in addition to those indicated above may be made in the apparatus and methods indicated above, and changes may be made with respect to the features disclosed, provided that the elements or steps set forth in the claims hereof or the equivalents of such be employed.

What is claimed is:

1. An object centering and moving mechanism for round or hexagonal objects having a center line and a finite range of sizes comprising, in combination, a fixed frame, a movable frame movable in a first path on said fixed frame, first caliper means on said movable frame to engage one side of any said object, second caliper means complementarily cooperable with said first caliper means to engage the opposite side of the object and capable of being spaced from said first caliper means a distance sufficient to accept said finite range of sizes of objects, support means including said first and second caliper means to support any said object on said movable frame, means including said support means to locate the center line of any said object in said first path, a linkage acting between said first and second caliper means, stop means acting between said fixed frame and said linkage, and said linkage including a 2:1 mechanical advantage of twice the relative motion between said first and second caliper means compared with the relative motion between said stop means and said fixed frame, whereby said movable frame may be moved in said first path to move any said object and to move said linkage to a point whereat said first and second caliper means engage any said object prior to or at the same time as the stop means engaging said fixed frame to establish the center line of any said object at a fixed reference point along said first path regardless of the diameter of said object.

2. An object centering and moving mechanism as set forth in claim 1, wherein said first path is a vertical path and said stop means is adjustable.

3. An object centering and moving mechanism as set forth in claim 1, wherein said first caliper means is a part of said movable frame to move therewith.

4. An object centering and moving mechanism as set forth in claim 1, wherein said first caliper means has a concave surface to engage objects having a round cross section.

5. An object centering and moving mechanism as set forth in claim 1, including means acting on said first and second caliper means relatively urging apart said first and second caliper means to accept any diameter object within said range of sizes.

6. An object centering and moving mechanism as set forth in claim 1, including means acting on said caliper means establishing said second caliper means disposed apart from said first caliper means in said first path a distance sufficient to accept an object therebetween of said range of sizes between a large diameter D1 and a small diameter D2.

7. An object centering and moving mechanism as set forth in claim 1, wherein said linkage and said stop means coact to physically stop movement of said linkage and of said movable frame to establish the center line of the object at said fixed reference point.

8. An object centering and moving mechanism as set forth in claim 1, wherein said linkage completes the relative motion of said first and second caliper means to engage opposite sides of the object prior to completion of movement of said movable frame with the center line of the object at said fixed reference point.

9. An object centering and moving mechanism as set forth in claim 1, wherein said first and second caliper means are relatively movable in said first path.

10. An object centering and moving mechanism as set forth in claim 9, wherein said first path is vertical.

11. An object centering and moving mechanism as set forth in claim 1, wherein said linkage includes a lever with said stop means acting on the midpoint of said lever.

12. An object centering and moving mechanism as set forth in claim 11, wherein said lever is a second class lever having a first end thereof pivoted on said movable frame.

13. An object centering and moving mechanism as set forth in claim 1, wherein said linkage includes a rack and pinion.

14. An object centering and moving mechanism as set forth in claim 1, wherein said locating means includes said first caliper means in the form of a V-shaped drive pulley, said second caliper means includes a V-shaped idler pulley, and means to drive said drive pulley to move elongated objects along the axial center line thereof at said fixed reference point with the elongated objects clamped between said drive pulley and idler pulley.

15. An object centering and moving mechanism as set forth in claim 14, including fluid power means connected to move said movable frame to clamp an object between said pulleys.

16. An object centering and moving mechanism for round or hexagonal objects having a center and having a finite range of sizes, including support means on a movable frame to support any said object relative to a fixed frame, said support means including first and second caliper means relatively movable to engage opposite sides of any said object and means including said support means to locate the center line of any said object in a first path, said movable frame adapted to move the object to have the center of the object at a fixed reference point, characterized in a stop means cooperable with the fixed frame, and a mechanical advantage linkage connected to said first and second caliper means and to said stop means to provide twice the relative motion between the first and second caliper means compared with the relative motion between said stop means acting between said linkage and said fixed frame, whereby said movable frame may move any said object in said first path to establish the center line of the object at said fixed reference point upon said first and second caliper means engaging opposite sides of the object prior to or at the same time as the stop means engaging said fixed frame.

17. A mechanism as set forth in claim 16, wherein said linkage includes a lever and said stop means acts between said lever and said fixed frame and is adjustable.

18. A mechanism as set forth in claim 17, wherein said stop means acts on the midpoint of said lever.

19. A mechanism as set forth in claim 16, wherein said linkage includes rack and pinion means.

20. A mechanism as set forth in claim 19, wherein said rack and pinion means includes first and second pinions with said second pinion being twice the pitch diameter of said first pinion.

21. A mechanism as set forth in claim 16, wherein said first caliper means is connected as a part of said movable frame and both being movable in said first path.

* * * * *